(12) United States Patent
Jenkins et al.

(10) Patent No.: US 7,321,708 B2
(45) Date of Patent: Jan. 22, 2008

(54) OPTICAL FIBRE AMPLIFIER

(75) Inventors: Richard M. Jenkins, Malvern (GB); Mark E. McNie, Malvern (GB); Nicola Price, Malvern (GB); Craig D. Stacey, Malvern (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/580,750

(22) PCT Filed: Nov. 26, 2004

(86) PCT No.: PCT/GB2004/004992

§ 371 (c)(1),
(2), (4) Date: May 26, 2006

(87) PCT Pub. No.: WO2005/055377

PCT Pub. Date: Jun. 16, 2005

(65) Prior Publication Data

US 2007/0097491 A1 May 3, 2007

(30) Foreign Application Priority Data

Nov. 28, 2003 (GB) .................................. 0327661.5

(51) Int. Cl.
*H01S 3/00* (2006.01)
*G02B 6/26* (2006.01)

(52) U.S. Cl. ..................... 385/52; 359/341.1

(58) Field of Classification Search ................. 385/52; 359/341.1
See application file for complete search history.

(56) References Cited

U.S. PATENT DOCUMENTS

| | | | | |
|---|---|---|---|---|
| 5,253,104 A | * | 10/1993 | Delavaux | 359/341.33 |
| 5,526,454 A | * | 6/1996 | Mayer | 385/49 |
| 5,574,811 A | * | 11/1996 | Bricheno et al. | 385/52 |
| 5,778,132 A | * | 7/1998 | Csipkes et al. | 385/135 |
| 5,915,061 A | * | 6/1999 | Vanoli | 385/135 |
| 6,072,931 A | | 6/2000 | Yoon et al. | |
| 6,081,369 A | | 6/2000 | Waarts et al. | |
| 6,144,792 A | * | 11/2000 | Kim et al. | 385/135 |
| 6,256,138 B1 | | 7/2001 | Huang | |
| 6,310,717 B1 | * | 10/2001 | Naganuma et al. | 359/341.1 |
| 6,334,020 B1 | * | 12/2001 | Fujimori et al. | 385/134 |
| 6,611,372 B1 | | 8/2003 | Peyghambarian et al. | |
| 6,738,186 B2 | | 5/2004 | Jiang et al. | |
| 6,741,785 B2 | * | 5/2004 | Barthel et al. | 385/135 |
| 6,768,827 B2 | * | 7/2004 | Yoo | 385/14 |

(Continued)

FOREIGN PATENT DOCUMENTS

EP 0 717 479 6/1996

(Continued)

*Primary Examiner*—Deandra M Hughes
(74) *Attorney, Agent, or Firm*—McDonnell Boehnen Hulbert & Berghoff LLP

(57) ABSTRACT

An optical amplifier is described that comprises at least two sections of amplifying optical fibre and pumping means for optically pumping the amplifying optical fibre. Optical fibre support means, for example a channel or channels in a substrate, are also provided to hold the two or more sections of amplifying optical fibre substantially straight during use. The optical fibre support means also includes a means for coupling light between the at least two sections of amplifying optical fibre. The at least one amplifying optical fibre may comprise an Erbium doped core to provide an erbium doped fibre amplifier (EDFA).

28 Claims, 6 Drawing Sheets

U.S. PATENT DOCUMENTS

| | | | |
|---|---|---|---|
| 6,917,731 B2* | 7/2005 | Bennett et al. | 385/15 |
| 7,072,542 B2* | 7/2006 | Jenkins et al. | 385/28 |
| 2002/0075559 A1 | 6/2002 | Lange et al. | |
| 2003/0016440 A1 | 1/2003 | Zeidan et al. | |
| 2003/0048815 A1 | 3/2003 | Cook | |
| 2003/0086446 A1 | 5/2003 | Sugiyama et al. | |
| 2003/0169489 A1 | 9/2003 | Jiang et al. | |
| 2003/0197186 A1* | 10/2003 | Geusic et al. | 257/80 |
| 2005/0089262 A1* | 4/2005 | Jenkins et al. | 385/14 |
| 2006/0104592 A1* | 5/2006 | Jenkins et al. | 385/140 |
| 2006/0171626 A1* | 8/2006 | McNie et al. | 385/14 |
| 2006/0177177 A1* | 8/2006 | Jenkins et al. | 385/33 |
| 2006/0193592 A1* | 8/2006 | McNie et al. | 385/140 |
| 2006/0215954 A1* | 9/2006 | Jenkins et al. | 385/18 |

FOREIGN PATENT DOCUMENTS

JP    040268538    9/1992

\* cited by examiner

OPTICAL FIBRE AMPLIFIER

BACKGROUND OF THE INVENTION (1) Field of the Invention

The present invention relates to a fibre amplifier, and more particularly to an erbium doped fibre amplifier (EDPA).

(2) Description of the Art

Optical fibre based networks are known and have been implemented in many forms using both single mode and multi-mode optical fibres. Multi-mode optical fibre based systems typically have a limited bandwidth due to modal dispersion effects within the fibre. Although modal dispersion effects can be reduced or eliminated by using parabolically graded index multimode fibres and the like, such fibres are difficult and expensive to manufacture. Multi-mode optical fibres are thus typically only used in low speed network applications.

Modal dispersion effects are, by definition, insignificant in single mode optical fibres and such fibres are thus used in high bandwidth data transmission systems. However, the small core diameter (typically less than 10 μm) that is required to maintain single mode propagation limits the optical power that can be coupled into the fibre. Optical amplifiers are thus often necessary when data is transmitted through long lengths of single mode optical fibre.

One known type of optical amplifier suitable for use in single mode optical fibre systems are so-called erbium doped fibre amplifiers (EDPAs). A typical EDFA comprises a single mode optical fibre having a core region formed from glass that is doped with erbium. A signal beam (e.g. of wavelength around 1550 nm) and a pump beam (e.g. of wavelength 980 nm or 1480 nm) are coupled into the doped optical fibre. The pump beam causes amplification of the signal beam within the erbium doped optical fibre.

The relatively low optical gain of erbium doped glass means that many meters (e.g. tens or hundreds of meters) of single mode optical fibre is required in a typical EDFA. Known EDFAs can thus be physically large and quite costly. Furthermore, the small core diameter places a limit on the maximum optical power output of known EDFAs due to non-linear effects within the fibre and radiation induced damage to the fibre core and/or to the end facet of the fibre.

U.S. Pat. No. 6,611,372 describes an optical amplifier arrangement in which a single piece of phosphate glass optical fibre is held in a v-groove channel in a substrate. The optical fibre described in U.S. Pat. No. 6,611,372 is typically less than 20 cm long and has a core diameter in the range of 50-100 μm.

SUMMARY OF THE INVENTION

It is an object of the present invention to mitigate at least some of the above mentioned disadvantages of known fibre amplifiers.

According to the present invention, an optical amplifier comprises at least two sections of amplifying optical fibre, pumping means for optically pumping the at least two sections of amplifying optical fibre and an optical fibre support means for holding the at least two sections of amplifying optical fibre substantially straight during use, wherein the optical fibre support means additionally comprises means to couple light between the at least two sections of amplifying optical fibre.

An optical amplifier is thus provided in which a plurality of sections of amplifying optical fibre are supported by an optical fibre support means which holds the fibre sections substantially straight. The optical fibre support means thus minimises modal conversion effects by preventing any substantial bending of the optical fibre. In other words, optical fibre support means ensures that any optical power initially coupled into the fundamental mode of a section of amplifying optical fibre is not coupled into higher order modes as it propagates through the fibre.

The optical amplifier of the present invention is formed using two or more sections, or lengths, of amplifying optical fibre. The optical fibre support means also comprises means to couple light between the lengths of amplifying optical fibre; for example the optical fibre support means may include hollow core optical waveguides or free space optical arrangements of the type described in more detail below. In this manner, a long effective optical path for a beam to be amplified can be provided in a compact space using only optical fibre sections that are held substantially straight. The present invention thus offers a more compact optical amplifier arrangement than that described in U.S. Pat. No. 6,611,372 without the need to bend the amplifying optical fibres from which the device is formed. Preventing bending of the amplifying optical fibres is especially advantageous when, as outlined above, it is wished to efficiently propagate light through the fibres predominantly in the fundamental mode.

It should be noted that the term "optical" is used herein to refer to any electromagnetic radiation having a wavelength from the deep ultraviolet to the far infra-red. Furthermore, the term "amplifying optical fibre" as used herein means an optical fibre that is adapted (e.g. by doping the core with a rare earth metal such as erbium) to amplify an input beam of a first wavelength when optically pumped with radiation of an appropriate second wavelength.

Advantageously, the optical fibre support means comprises a substrate comprising at least two channels, each of the at least two sections of amplifying optical fibre being located in a channel of the substrate. In other words, the optical fibre support means comprises a substrate having at least two channels formed therein or thereon for receiving the sections of amplifying optical fibre.

The provision of channels in a substrate provides a convenient way of holding the sections of optical fibre substantially straight. The channels are preferably dimensioned to provide a snug fit for the optical fibre(s) to ensure the fibres are prevented from bending after insertion. Alternatively, the fibre may be partially inserted into a channel to provide the required fibre straightness and secured in place. The optical fibres may be stripped to the cladding before insertion into the channels, or the channels may be arranged to receive the fibre plus any associated external coating layer. The channels may advantageously have a circular or rectangular (including square) cross-section, or they may have a v-groove construction. In order to protect the fibre from mechanical damage, and to ensure it remains retained within the substrate, a separate lid portion may be attached (e.g. glued) to the substrate. Spring clips, micro-grippers or other mechanical positioning means (e.g. MEMS actuators) may also be provided to secure the optical fibre in place.

The substrate may also comprise cooling channels, vents and/or apertures through and/or over which a cooling fluid (e.g. a liquid or a gas) may be passed. Cooling the substrate in this manner prevents any build up of heat when high power optical signals are amplified using high power pump beams.

Advantageously, the channels of the substrate are formed adjacent and substantially parallel to one another thereby forming a folded arrangement. The use of a folded arrangement enables the amplifier to be significantly reduced in physical size.

In order to reduce optical losses and to ensure fundamental mode propagation is maintained, hollow core optical waveguides may advantageously be formed in the substrate to guide radiation between each of the plurality of amplifying optical fibres. The hollow core optical waveguides may have a rectangular (including square) cross-section. A square, or almost square, cross-section hollow core waveguide provides a waveguide in which the losses are substantially polarisation independent and is preferred when the polarisation state of the light is unknown or varying. Dimensioning the waveguide to have a depth greater than its width increases polarisation dependent losses, but may be advantageous when the polarisation state of light propagating through the waveguide is known. Although rectangular cross-section waveguides are convenient, many alternative waveguide shapes could be employed. For example, circular, elliptical or v-shaped waveguides could be provided. As described in WO 03/065091, the hollow core optical waveguide may also carry a reflective coating on their internal surfaces.

It should be noted that when hollow core optical waveguide structures are produced, the hollow core is likely to fill with air. However, this should be seen in no way as limiting the scope of this invention. The hollow core may contain any fluid (for example a liquid or an inert gas such as nitrogen) or be a vacuum. The term hollow core simply means a core which is absent any solid material.

Although the formation of hollow core waveguides is preferred, light could alternatively be coupled between each of the plurality of amplifying optical fibres in free space. Appropriate lenses or shaped reflectors could be provided to minimise diffraction effects and thus maximise the optical coupling efficiency between the various lengths of amplifying optical fibre.

Furthermore, at least one alignment slot may advantageously be formed in the substrate wherein the at least one alignment slot is arranged to receive an optical component. For example, the substrate may carry mirrors, lasers, filters, optical isolators, lenses etc as required to implement the desired optical arrangement. The alignment slots are appropriately shaped to accept the component and may thus be deeper/shallower and/or wider/narrower than any associated hollow core optical waveguides as necessary. Spring clips or micro-grippers may be used to secure the components in place.

Each alignment slot formed in the substrate may be fabricated with sufficient accuracy to align the optical component that it receives. Placing an optical component in such an alignment slot will thus inherently align the optical component and a component alignment or adjustment step is not required. In other words, passive alignment of optical components is provided instead of requiring an active alignment step in which the position of a component is adjusted (e.g. by hand) until the desired alignment is achieved. The formation of optical circuits using hollow core optical waveguides to link components is described in more detail in WO 03/065091, the contents of which are incorporated herein by reference thereto.

Advantageously, a lens is retained or held in the at least one alignment slot. As described below, a single lens may be used to mode match optical field between optical fibres having different numerical apertures.

Alternatively, or additionally, certain optical components may be monolithically formed from the substrate. The various optical components and layouts that may advantageously be included in an EDFA arrangement would be known to the skilled person.

The substrate may also comprise at least one optical fibre end attachment means for receiving the end of an input or output single mode optical fibre. The attachment means may comprise a groove formed in the substrate and arranged to hold a solid core optical fibre in place thereby allowing optical inputs/outputs to be made to the amplifier. Stepped optical fibre alignment slots may also be provided to hold both the buffer layer and the cladding. Spring clips, micro-grippers or other mechanical positioning means may also be provided to secure the optical fibre in place.

Advantageously, the fibre retaining channels and/or the optical waveguides may be formed in a substrate comprising semiconductor material. Semiconductor substrates, such as Silicon, can conveniently be etched to provide hollow core waveguides with high accuracy using micro-fabrication techniques. The substrate may advantageously comprise a multiple layer wafer; for example SiGe, silicon-on-insulator (SOI), silicon-on-glass or GaAs-on-silicon. A person skilled in the art would recognise that micro-fabrication techniques typically involve a lithography step to define a pattern, followed by an etch step to transfer the pattern in to one or more layers on, or in, the substrate material. The lithography step may comprise photolithography, x-ray or e-beam lithography. The etch step may be performed using physical means (such as lift-off or ion beam milling), a chemical etch or a dry plasma etch. Advantageously, the optical circuit is formed by deep reactive ion etching (also termed a deep dry etch or a deep silicon etch). Micro-fabrication techniques of this type are also compatible with various layer deposition techniques such as sputtering, CVD and electro-plating.

Although substrates that comprise semiconductor material can advantageously be used, the device could also be formed on a variety of alternative substrates. For example, quartz, silica or glass substrates could be used. Conveniently, the substrate used in the present invention can readily have semiconductor processing techniques applied thereto. It should be noted that although semiconductor processing techniques are, by definition, developed for use with semiconductor substrates they may also be advantageously applied to certain non-semiconductor substrates where the semiconductor properties of the substrate are not required. As described in WO 03/065091, embossed or moulded plastic substrates may also be used.

Alternatively, the substrate may advantageously comprise metal. Metal substrate have a high thermal conductivity and may be advantageous when components (e.g. laser diodes) are used which generate significant amounts of heat that needs to be dissipated. Machinable glass ceramic substrates (e.g. alumina) may also be advantageously used. A number of known milling techniques, for example computer controlled milling, laser machining or spark erosion, may be used to form the required channels in such substrates.

Although an optical fibre support means comprising a substrate is advantageous, a variety of alternative optical fibre support means may be provided in accordance with the invention. For example, elongate support tubes or fibre tensioning means could be provided to exert sufficient force on the fibre to hold it substantially straight.

Advantageously, the pump beam is routed through the plurality of amplifying optical fibres in series. Alternatively, the pump beam may conveniently be separately directed to each amplifying optical fibre (i.e. provided in parallel). Serial pumping has the advantage of being less complex to implement, but the optical power of the pump beam will reduce as it passes through the optical fibres. Parallel pumping arrangements are more complex to implement, but allow optimum pumping power levels to be maintained in the optical fibres and can thus increase the overall optical gain of the amplifier. A combination of serial and parallel pumping may also be used in amplifiers having three or more sections of amplifying optical fibre. Improved control of the pump power distribution through an amplifying fibre path can thus be provided by the present invention.

It should be noted that although the pump beam may be provided to the sections of amplifying optical fibre in a number of different way, the signal beam (i.e. the beam to be amplified) is passed through the sections of amplifying optical fibre in series. In other words, the light of the signal beam is coupled between the at least two sections of amplifying optical fibre. As outlined below, selective reflectors may be used to separate the pump and signal beams as required to allow the desired optical arrangement to be implemented. At least one optical isolator may also be provided to reduce optical oscillations within the sections of amplifying fibre.

The skilled person would appreciate that the amplifying optical fibre may advantageously be cladding pumped. Cladding pumped single mode optical fibres are known; for example see S. U. Alam et. al., "high power cladding pumped erbium-ytterbium co-doped fibre laser" in proc. OFC 2001, Anaheim, USA, Mar. 17-22, 2001, paper TU14. In such fibres, a fibre core is surrounded by inner and outer cladding layers. The fibre is arranged such that the beam to amplified is guided within the fibre core (i.e. by reflection from the fibre core and inner cladding layer interface) whilst the pump beam is guided within the fibre core and inner cladding layer (i.e. by reflection from the inner and outer cladding layers). In this manner, the pump radiation intensity can be increased without damaging the fibre core and is distributed along a greater length of the optical fibre.

In the case of the fibre support means comprising a hollow channel, the hollow channel itself may form part of the "cladding" waveguide for the pump radiation. In other words, the amplifying optical fibre may have a fibre core and cladding layers that are arranged to guide the beam to be amplified along the core. In addition, the optical amplifier may be arranged such that the pump beam is guided along the core/cladding of the fibre by reflection at the interface between the cladding layer and the hollow channel. In this manner, the various advantages of cladding pumped operation described above are obtained.

Preferably, the core diameter of at least one section of amplifying optical fibre(s) is greater than 20 μm, more preferably it is greater than 30 μm, more preferably it is greater than 50 μm, more preferably it is greater than 100 μm, more preferably it is greater than 150 μm, more preferably it is greater than 200 μm or more preferably it is greater than 250 μm. The larger the core diameter, the higher the optical gain that the amplifier can provide for a given length of optical fibre. The sections of optical fibre may have the same, or different, core diameters.

Preferably, at least one section of amplifying optical fibre is a multi-mode optical fibre. The term multi-mode optical fibre as used herein refers to a fibre having a core diameter sufficiently large in relation to the step in refractive index between the core and the cladding that the fibre is capable of supporting the propagation of a plurality of optical modes at the wavelength of operation.

Multi-mode optical fibre(s) have a core diameter that is typically significantly larger (e.g. by up to several orders of magnitude) than standard single mode optical fibres. An optical gain per unit length can thus be achieved using such fibres that is greater, by up to several orders of magnitude, than that possible using known single mode amplifying optical fibres. Traditionally, the skilled person would have discounted the use of multi-mode optical fibres in a single mode fibre amplifier due to the modal conversion effects that would normally reduce the fundamental mode output power. However, providing an optical fibre support means in accordance with the invention enables light to be propagated through sections of multi-mode optical fibre primarily in the fundamental mode.

Instead of a multi-mode amplifying optical fibre, at least one section of amplifying optical fibre may advantageously be a single mode fibre. It is preferred that the single mode optical fibre is arranged to have a low step index (i.e. a relatively small difference in refractive index between the core and the cladding) and a large core diameter (e.g. greater than 20 μm, greater than 30 μm, greater than 50 μm, greater than 100 μm or greater than 200 μm). Any significant bending of such an optical fibre results in optical power being coupled from the fundamental mode into higher order optical modes. However, any higher order modes that are excited do not efficiently propagate through the optical fibre because the low step index attenuates any optical power coupled therein.

A low step index single mode fibre can thus be considered to be analogous to a multi-mode fibre; in a multi-mode fibre modal conversion effects cause the excitation of higher order modes that propagate through the length of the optical fibre whereas higher order mode excited in a low step index single mode optical fibre are attenuated due to the low step index. In other words, multi-mode optical fibres and low step index single mode optical fibres have an increased core diameter but provide significantly reduced fundamental mode power transmission if they are significantly bent.

The optical fibre support means of the present invention thus provides, when used with a multi-mode amplifying optical fibre or a low step index single mode amplifying optical fibre, higher optical gain amplifiers and/or more compact optical amplifier arrangements than previously possible. Fibre amplifiers of the present invention are also suitable for use in single mode optical fibre networks. Furthermore, the maximum optical power that can be handled by the amplifier is also increased; i.e. the larger fibre core allows the total output power to be increased without increasing the power density within the fibre core. A fibre amplifier of the present invention can thus be arranged to provide a substantially higher output power than prior art single mode fibre amplifiers.

Advantageously, the core of said at least one amplifying optical fibre comprises a rare earth metal dopant. Erbium is preferred, and in such a case the pumping means is arranged to provide radiation having one or more wavelengths corresponding to the $^4I_{15/2}$ to $^4I_{11/2}$ transition in Erbium. For example, a pump wavelength of around 915 nm, 980 nm and/or 1480 nm may be used. Ytterbium dopant may also be used, advantageously in combination with Erbium.

Advantageously, beam input means are provided to couple an input beam into a section of amplifying optical fibre. Preferably, the beam input means is arranged such that the input beam predominantly excites the fundamental mode of propagation in the at least one amplifying optical fibre. This further reduces modal conversion effects.

The beam input means may, for example, comprise at least one lens or a plurality of lenses to accurately focus the input beam onto the core of the optical fibre with acceptable levels of lateral and angular misalignment with respect to the optical axis of the fibre core. The at least one lens of the beam input means may be appropriately positioned in free space (e.g. on an optical bench) or, as described below, aligned in or formed from an appropriate substrate. The quality of alignment of the incident signal beam with the fibre core will determine the amount of optical power coupled into the fundamental mode of the amplifying optical fibre and hence dictates the overall device performance when used in a single mode system.

It should be noted that if a range of optical modes (including the fundamental mode) are excited by the incident signal beam, the use of the optical fibre support means to hold the multi-mode optical fibre straight will ensure that minimal optical power is transferred from the fundamental mode to higher order mode during transmission through the optical fibre. The power in the higher order modes can then be dumped, and only the fundamental mode radiation provided for onward transmission. Obviously, such an arrangement is less efficient than ensuring the majority of optical power excites the fundamental mode of the amplifying fibre in the first instance.

The beam input means is preferably arranged to receive an input beam from a single mode optical fibre. Furthermore, the optical amplifier may additionally comprise output means to couple the amplified beam into an output single mode optical fibre. In this manner, the optical amplifier may be employed in a high bandwidth single mode optical fibre network.

Conveniently, the input beam received by the optical amplifier is modulated. For example, in the case of a data network, the input beam may be intensity modulated to carry a data signal. Alternatively, the optical amplifier may advantageously be arranged to receive a CW beam from a laser source or a prior art (i.e. low power) fibre amplifier system.

It should also be appreciated that an optical amplifier of the present invention can be used in various applications that require the production of high levels of optical power. Optical fibre based laser radar (LIDAR) devices are an example of a system that would benefit from the higher levels of optical power that can be produced by an amplifier of the present invention. At present, the performance of optical fibre based LIDAR systems is limited by the optical power that can be generated using known EDFAs. Providing an optical amplifier of the present invention can greatly increase (i.e. by several orders of magnitude) the optical power output and hence the performance (e.g. range, sensitivity etc) of LIDAR systems. In particular, a prior art (i.e. low power) EDFA may be used as a pre-amplifier that outputs an optical beam to a power amplifier of the present invention.

Advantageously, the pumping means comprises at least one laser. It is also convenient for the pump radiation produced by the at least one laser to be coupled into a section of amplifying optical fibre. Conveniently, the pump radiation is arranged to excite predominantly the fundamental mode of each of the amplifying optical fibre. Coupling the pump radiation into the fundamental mode of the amplifying optical fibre ensures a good overlap with the signal beam that also propagates in the fundamental mode. This maximises the pumping efficiency of the amplifier.

The pumping means may conveniently comprise at least one multimode optical fibre optically coupled to the output of the at least one laser, said multimode optical fibre also being optical coupled to a section of amplifying optical fibre. Such laser pump devices are commercially available.

As described in more detail below, it is advantageous for the output from the multi-mode optical fibre of the laser pump device to be efficiently coupled into the section of amplifying optical fibre. To maximise coupling, the numerical aperture of the amplifying optical fibre is advantageously greater than the numerical aperture of the multimode optical fibre of the laser pump device. The multimode optical fibre may also be conveniently coupled to a section of amplifying optical fibre via a lens system having a magnification (m), wherein the numerical aperture of the amplifying optical fibre is greater than the product of the numerical aperture of the multimode optical fibre and the magnification (m). This ensures optical coupling between the optical fibres is maximised.

Alternatively, the pump radiation may be directed to the optical fibre core through the cladding (i.e. side pumping). For example, the pumping means may advantageously comprise an array of laser diodes, said array of laser diodes being arranged to apply a pump beam to the side of each of said at least one amplifying optical fibre. The use of a diode array is preferred for side pump arrangements because it allows pumping to be readily achieved using a plurality of lower power output laser diodes. A cladding pumped arrangement may also be implemented.

Advantageously, selectively reflective resonator elements can be provided at each end of the at least one amplifying optical fibre so as to form a resonant cavity. The selectively reflective resonator elements may be arranged to provide a resonant cavity for the pump beam and/or the beam to be amplified. For example, the optical amplifier may retain pump radiation within the amplifying fibre, but allow the passage of a beam to be amplifier therethrough. Alternatively, or additionally, the selectively reflective resonator elements may be arranged to allow the build up of amplified radiation within the amplifying optical fibre; i.e. the optical amplifier may act as a resonant laser cavity.

A substrate for an optical amplifier according to the first aspect of the invention may also be provided. A rare earth doped optical fibre for use in a fibre amplifier of the first aspect of the invention may also be provided, wherein the rare earth doped optical fibre has a core diameter greater than 20 µm. More preferably the core diameter is greater than 30 µm, more preferably it is greater than 50 µm, more preferably it is greater than 100 µm, more preferably it is greater than 150 µm, more preferably it is greater than 200 µm or more preferably it is greater than 250 µm. Advantageously, the rare earth dopant is erbium.

An optical amplifier may also comprise at least one amplifying optical fibre and pumping means for optically pumping the at least one amplifying optical fibre. Optical fibre support means may also be provided to hold said at least one amplifying optical fibre substantially straight during use.

DESCRIPTION OF THE FIGURES

The invention will now be described, by way of example only, with reference to the following drawings in which.

DETAILED DESCRIPTION OF THE INVENTION

Figure 1:
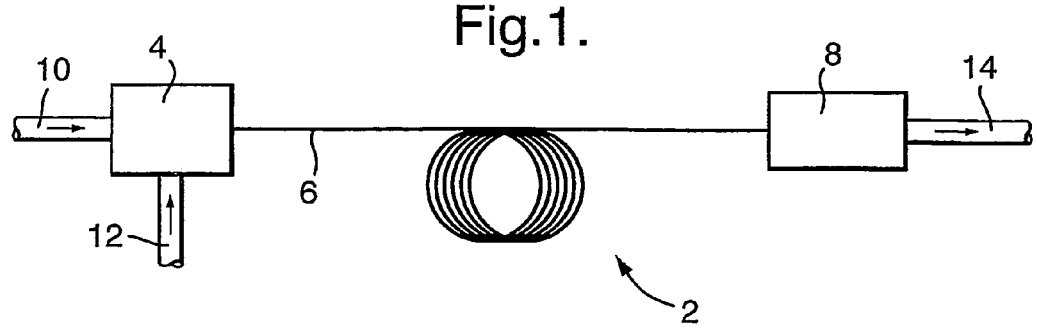
FIG. 1 shows a prior art EDFA.

Referring to FIG. 1, a prior art erbium doped fibre amplifier 2 is illustrated. The amplifier 2 comprises an input stage 4, an erbium doped single mode optical fibre 6 and an output stage 8. The erbium doped optical fibre 6 is around ten metres long, and is typically arranged in a loose coil of several centimeters in radius.

The input stage 4 is arranged to couple a signal beam from an input single mode optical fibre 10 and an incident pump beam 12 into the erbium doped single mode optical fibre 6. The pump beam 12 causes the signal beam to be amplified within the erbium doped optical fibre 6, and the amplified signal beam is received by the output stage 8 and coupled into an output single mode optical fibre 14 for onward transmission.

As described above, single mode optical fibres used in known EDFAs have a small core diameter (several microns only). This small core diameter means long lengths of single mode optical fibre are necessary to achieve the required gain. This places a fundamental limit on the minimum physical size to which the amplifier 2 can be reduced. The small core diameter also limits the power handling capabilities of such single mode fibres to around a watt or so.

In accordance with the present invention, it has been found that the core diameter of an erbium doped optical fibre can be increased provided that the fibre is held substantially straight during use (for example in a channel formed in the surface of a silicon substrate). This arrangement allows a fundamental mode field to be excited in, and propagate through, an optical fibre having a larger diameter core than prior art erbium doped fibres without any significant optical loss due to modal conversion effects.

In particular, so-called multi-mode amplifying optical fibres can be used in an amplifier of the present invention. Such optical fibres have much larger core diameters (several hundred microns) than prior art single mode optical fibres. The increased core diameter allows the required optical gain to be achieved with a much shorter length of fibre. Furthermore, because of the much larger core cross-sections, multi-mode optical fibres are able to handle a higher power density and thus allow a higher overall power throughput than prior art single mode erbium doped fibres. It should be re-emphasised that the production of multi-mode amplifying optical fibres for use in EDFAs has, to date, been discounted by those skilled in the art due to the modal conversion effects that occur in unsupported multi-mode optical fibres.

Although multi-mode optical fibres are described in the various examples given below, the skilled person would appreciate that the teachings of the present invention are equally valid when applied to single mode optical fibres that have a large core diameter and a low step index (i.e. a relatively small difference in refractive index between the core and the cladding). In fact, a low step index single mode fibre is quite similar to a multi-mode fibre; in a multi-mode fibre modal conversion effects due to bending cause the excitation of higher order modes that propagate through the length of the optical fibre whereas any higher order mode excited in low step index single mode optical fibres are attenuated within a short distance.

For an optical fibre, the number of modes (N) that can be excited is given by the approximation;

$$N \propto \frac{2\pi}{\lambda} a \sqrt{n_1^2 - n_2^2} \quad (1)$$

where a is the radius of the fibre core, $\lambda$ is the wavelength of light, $n_1$ is the refractive index of the core and $n_2$ is the refractive index of the cladding. The so-called step index of the optical fibre is simply $n_1$-$n_2$.

It can be seen from equation (1) that increasing the core radius will increase the number of mode excited in an optical fibre for a given step index. It can also be seen that single mode propagation can be maintained for an increased core radius provided that the step index is decreased. Any significant bending of such a low step index optical fibre will result in optical power being coupled from the fundamental mode into higher order optical modes, but these higher order modes will be strongly attenuated.

A low step index single mode fibre may thus be considered to be analogous to a multi-mode fibre; in a multi-mode fibre modal conversion effects cause the excitation of higher order modes that propagate through the length of the optical fibre whereas higher order mode will be excited in low step index single mode optical fibre but are attenuated due to the low step index. In other words, multi-mode optical fibres and low step index single mode optical fibres have an increased core diameter but provide significantly reduced fundamental mode power transmission if they are significantly bent.

Referring to FIG. 2, a number of substrates capable of holding an optical fibre substantially straight are shown.

Figure 2A:
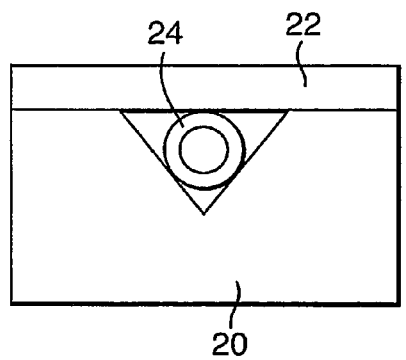
FIG. 2 shows a multi-mode fibre held straight in various alignment means.

FIG. 2a shows a silicon substrate 20 in which a V-groove is formed by wet etching and an associated lid portion 22. The V-groove is dimensioned to support, and hold substantially straight, the erbium doped multi-mode optical fibre 24.

Figure 2B:
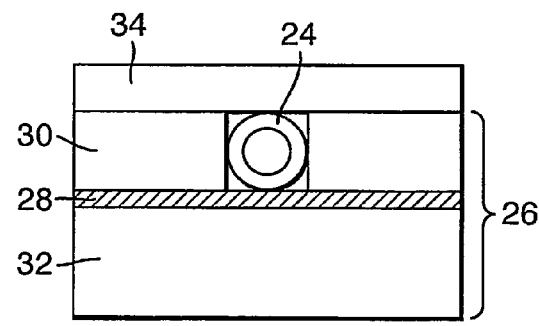

FIG. 2b shows a silicon-on-insulator (SOI) substrate 26. The SOI substrate 26 is formed from an $SiO_2$ layer 28 sandwiched between an upper silicon layer 30 and a lower silicon layer 32. The $SiO_2$ layer 28 acts as an etch stop. This allows the upper silicon layer 30 to be etched down to the etch stop, thereby enable channel depth to be very accurately defined (i.e. the channel depth will equal the depth of the etch stop). A channel of rectangular cross section can thus be readily formed to hold an erbium doped multi-mode optical fibre 24. An $SiO_2$ lid portion 34 is also provided to ensure the fibre is retained within the alignment slot. The arrangements shown in FIGS. 2a and 2b have the advantage of not requiring the upper and lower portions to be brought into alignment in order to hold the optical fibre.

Figure 2C:
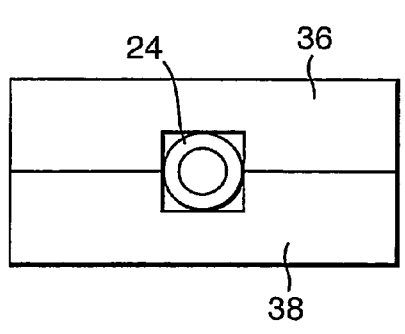

FIG. 2c shows another arrangement for holding an erbium doped multi-mode optical fibre 24 substantially straight. An upper substrate 36 and a lower substrate 38 are provided that both comprise an etched channel of substantially rectangular cross-section. The upper and lower substrates, when combined, define a channel in which the optical fibre is held.

Figure 2D:
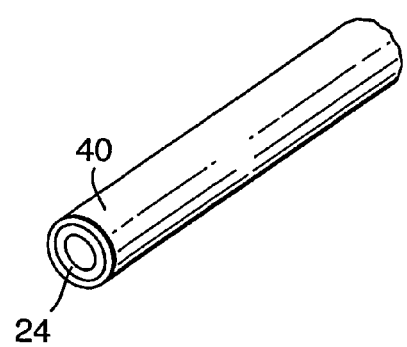

FIG. 2d shows a further arrangement for holding an optical fibre substantially straight. A elongate rigid tube 40 is provided into which the optical fibre 24 is inserted. The tube may be metallic, glass or plastic etc. The elongate tube may be located in a channel formed in/on a substrate to provide further rigidity.

Figure 3:
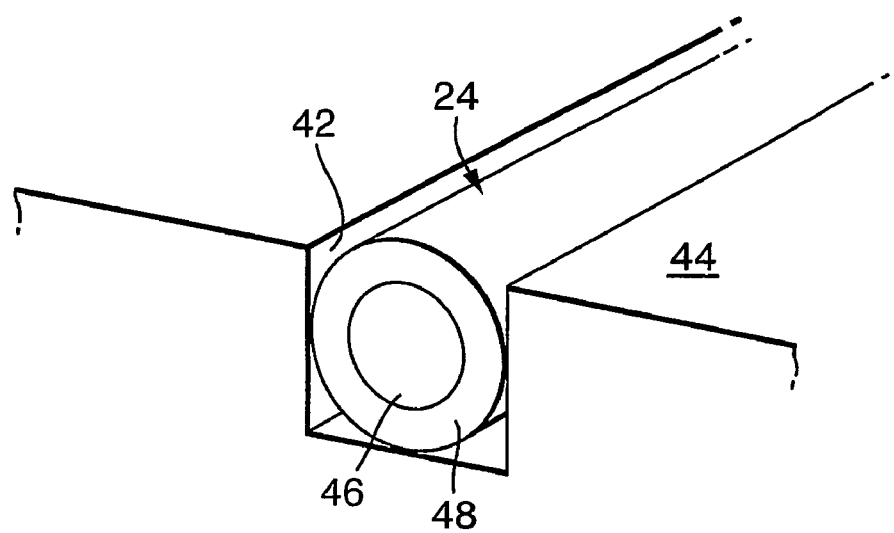
FIG. 3 shows an expanded view of a fibre held in a square cross-section channel.

It should be noted that although FIG. 3 illustrates a fibre fully inserted into a channel, the fibre may be partially inserted into a channel. For example, the amplifying fibre may be held straight by ridges formed in or on the surface of the substrate. Such a fibre may be secured to the substrate using an appropriate adhesive etc.

Figure 4:
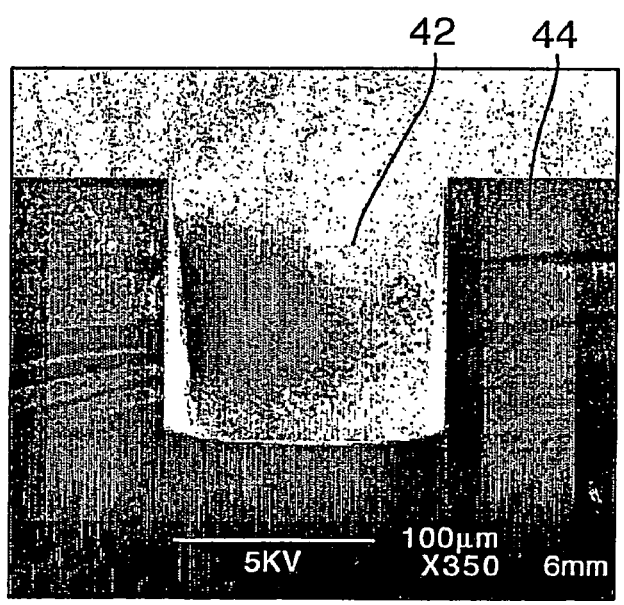
FIG. 4 shows a square channel formed in a silicon substrate.

Referring to FIG. 3, a rectangular cross-section channel 42 formed in a silicon substrate 44 is illustrated. A multi-mode erbium doped optical fibre 24 (comprising a core 46 and cladding 48) is located within, and held substantially straight by, the channel 42. FIG. 4 shows an image of such a channel formed in a silicon wafer using deep reactive ion etching.

Figure 5A:
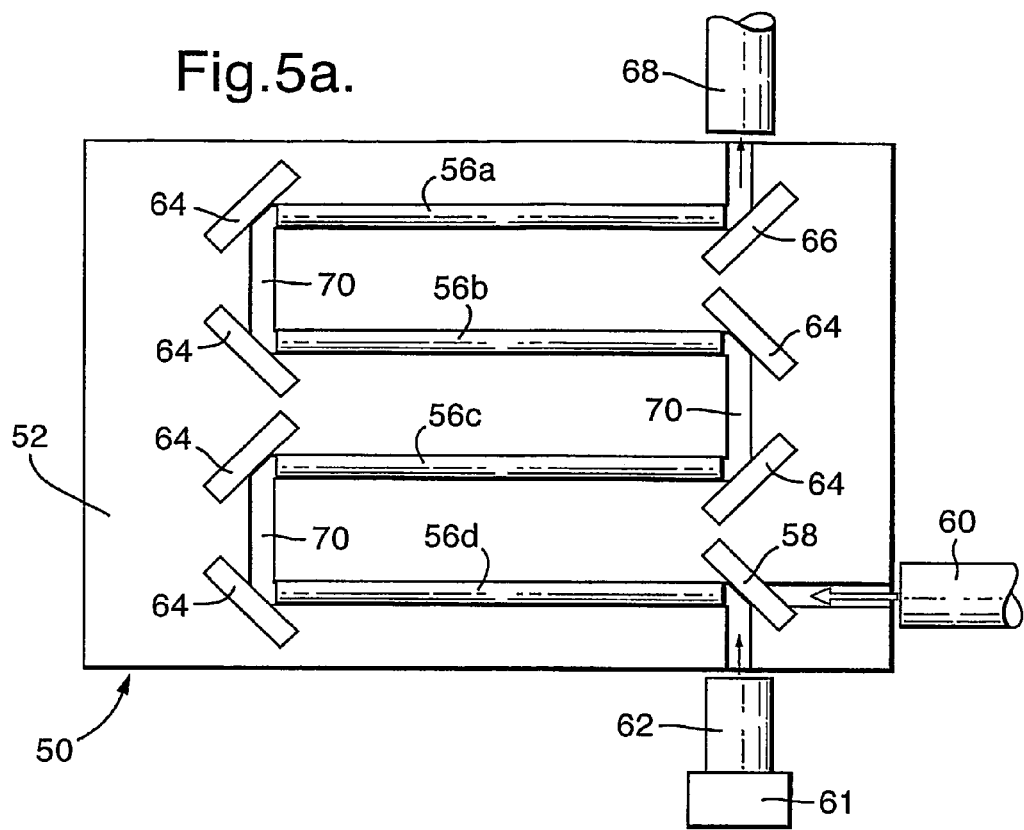
FIG. 5 shows a folded EDFA incorporating a multi-mode waveguide.
Figure 5B:
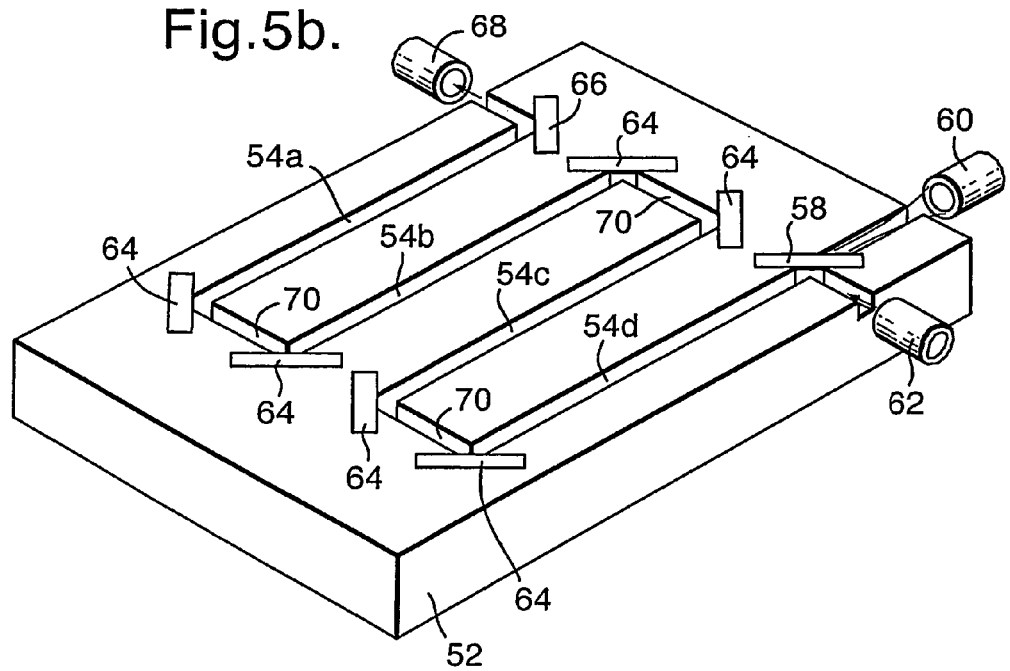

Referring to FIG. 5, an EFDA arrangement 50 according to the present invention is shown. FIG. 5a gives a perspective view of the EDFA 50, whilst FIG. 5b shows a side-on view of the substrate 52 from which the EDFA 50 is formed.

The EDFA 50 comprises a number of hollow channels formed in a silicon substrate 52. Four fibre retaining channels 54a-d (herein collectively referred to as retaining channels 54) are provided in the substrate to receive, and hold substantially straight, four lengths of erbium doped multi-mode optical fibre 56a-d (herein collectively referred to as multi-mode optical fibres 56). FIG. 5a illustrates the substrate 52 with the multi-mode optical fibres 56 inserted, whilst FIG. 5b shows the substrate prior to optical fibre insertion.

The four fibre retaining channels 54 are arranged to lie substantially parallel to one another. A wavelength selective reflector 58 is arranged to couple a signal beam from an input optical fibre 60 and a pump beam 62 from a laser 61 into the multi-mode optical fibre 56d. Mirrors 64 are also provided to route the combined signal/pump beam that exits the optical fibre 56d through each of the optical fibres 54a-c. A second wavelength selective reflector 66 is provided to separate the amplified signal beam from any residual pump beam as it exits the optical fibre 56a. The signal beam, which has been amplified as it propagates through the optical fibres 56, is then coupled into a single mode output optical fibre 68.

Light is guided between the four lengths of multi-mode optical fibre 56 by channels 70 formed in the substrate that are arranged to act as hollow core optical waveguides. Although not shown, the inner wall of the hollow channels 70 may be coated with a reflective material (e.g. gold, silver or copper) to reduce optical losses. Alignment slots are also formed in the substrate to receive and align the first and second selective reflectors 58 and 66 and the mirrors 64. Various additional optical components (e.g. lenses etc) may also be provided in the hollow channels 70 to act on the optical beam as it passes between the optical fibres 56. The use of a silicon substrate to hold optical components in alignment and the provision of hollow core optical waveguides to carry radiation between such components is described in more detail in WO 03/065091.

The EDFA 50 may be arranged such that "re-imaging" of a beam injected into the hollow channel 70 from one length of optical fibre (e.g. fibre 56d) occurs in the vicinity of the input aperture of a second length of optical fibre (e.g. fibre 56c). The re-imaging phenomena is explained in more detail elsewhere; for example see WO 03/065091. In short, the hollow core optical waveguide formed from the hollow channel 70 may be formed as a multi-mode waveguide. Appropriately dimensioning this multi-mode waveguide produces various beam splitting and combining functions in which beams can be produced that are images of the input beam.

In particular, rectangular or square cross-section hollow multi-mode waveguides can be designed to provide re-imaging of symmetric, anti-symmetric or asymmetric optical fields by designing the length of the waveguide to have an appropriate relationship to its width and depth. In other words, the Gaussian input profile of an input beam is re-imaged (i.e. reproduced) after propagating a certain distance along a given waveguide. This effect also gives rise to beam replication; i.e. multiple images of the beam being formed a distances shorter than the re-imaging length. This effect is described previously in U.S. Pat. No. 5,410,625 and provides the basis for multi-mode interference (MMI) beam splitting devices.

As an example, consider a symmetric field propagating in a square sectioned waveguide. This waveguide will have a re-imaging length given by the square of the waveguide width over the wavelength of the propagating radiation. Re-imaging of the symmetric field occurs at the re-imaging length and multiples of the re-imaging length. Inbetween the re-imaging points, beam replication points and points of maximum field expansion are found.

For the case of a 50.0 µm wide hollow waveguide and 1.55 µm radiation, the re-imaging length is thus 1.613 mm. The symmetric field would be re-imaged at this length and also at integer multiples of this length, i.e. 3.23 mm, 4.84 mm etc. A $TEM_{00}$ Gaussian input beam from a single mode optical fibre could thus be re-imaged at integer multiples of 1.613 mm.

Alternatively, for the case of an asymmetric optical field, re-imaging occurs at eight times the length required for symmetric field re-imaging, i.e. at 12.09 mm for a 50.0 µm wide hollow waveguide. A mirror image of the asymmetric field is also formed at half this length i.e. at 6.05 mm. In particular, offsetting the input from the centre line of the multimode region provides an asymmetric input that is re-imaged at pre-determined distances along the guide at an equivalent offset on either side of the centre line.

In the case of a rectangular waveguide where the depth and width of the waveguide are substantially different, the re-imaging lengths associated with the two waveguide cross-sectional dimensions (e.g. depth and width) are themselves different. However, by arranging that the relationship between the dimensions of the rectangular hollow waveguide is such that re-imaging is produced at identical lengths for the particular width and depth, any field can be re-imaged. Thus, a symmetric field can be re-imaged in a hollow rectangular waveguide by arranging that the re-imaging lengths associated with axes of width $w_1$, and $w_2$ to be identical.

The use of the re-imaging effect ensure efficient coupling between the various lengths of erbium doped fibre without the need for beam expansion/compression components such as lenses or shaped mirrors etc. The hollow waveguides may be optimised for re-imaging at the wavelength of the pump beam and/or the signal beam as required.

Figure 6:
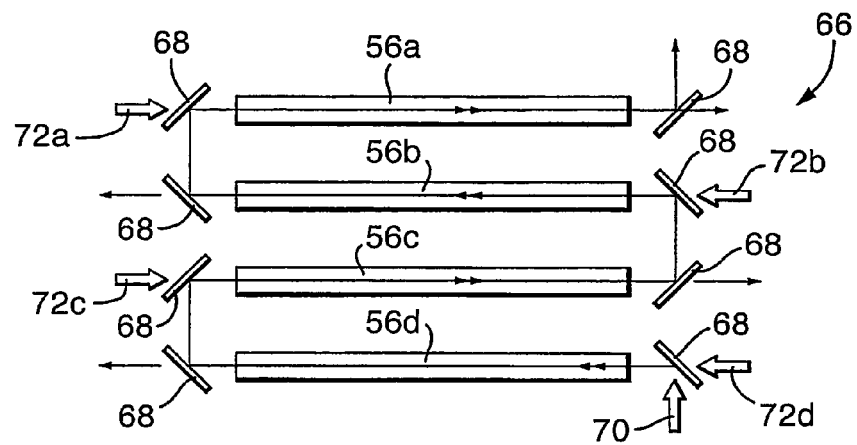
FIG. 6 shows a folded EDFA arrangement incorporating multiple pump beam inputs.

Referring to FIG. 6, a multiple pump EDFA 66 is illustrated. The EDFA 66 comprises four sections of multi-mode .erbium doped optical fibre 56 held in channels formed in a silicon substrate in the manner described above with reference to FIG. 5. Eight wavelength selective reflectors 68 are provided which allow transmission of the pump beam (e.g. 980 nm) but reflect the signal beam (e.g. 1.5 µm).

The EDFA 66 is arranged such that an incident signal beam 70 is routed through the four sections of multi-mode optical fibre 56 via reflection from the wavelength selective reflectors 68. Four pump beams 72a-72d are provided to separately pump each section of multi-mode erbium doped optical fibre 56. Various alternative arrangements of the EDFA are possible. For example, The reflectors 68 providing the folded arrangement could also have thin film coatings which allowed for wavelength filter and/or band pass manipulation.

The multiple pump arrangement of FIG. 6 provides increased pump efficiency, and has advantages with respect to the optimum pump power for a given input power level in terms of gain saturation and intensity trade-offs. Also, for broadband telecommunications applications, the individual pumping may allow appropriate gain profiling to be achieved. In other words, each pump beam may have a slightly different wavelength. Such an arrangement would also allow an amplifier to be provided that could amplify signals in both the 1300 nm & 1500 nm wavelength bands. Furthermore, the type of configuration illustrated in FIG. 6 would allow beam splitting and combining components (i.e. the reflectors 68) to be used that have the same characteristics.

It should be noted that although the optical arrangements shown in FIGS. 5 and 6 are formed on a flat substrate in a single plane, it is also possible to form devices in which the various components and fibre are arranged in a three dimensional stack. The use of a three dimensional stack has the potential to provide an even more compact arrangement.

The use of a supporting substrate to hold sections of multi-mode optical fibre substantially straight during use ensures that modal conversion effects as radiation propagates through the optical fibre are minimised. However, it is also advantageous to ensure that the radiation initially injected into the multi-mode optical fibre excites predominantly the fundamental mode thereof.

Figure 7:
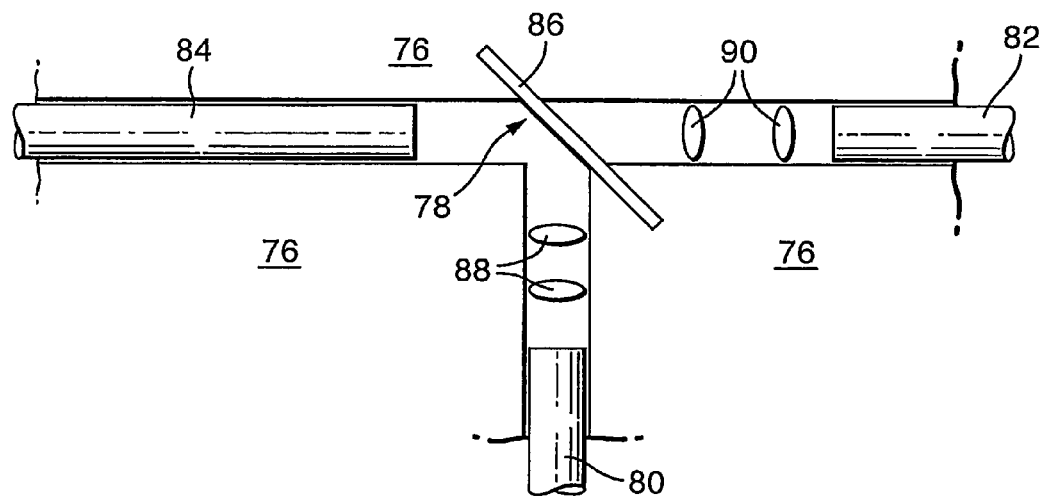
FIG. 7 shows means of coupling radiation into the fundamental mode of a multi-mode erbium doped fibre.

Referring to FIG. 7, an arrangement is shown that permits substantially all of the optical power in a beam to be coupled into only the fundamental mode of a multi-mode optical fibre. The arrangement comprises a silicon substrate 76 in which a T-shaped channel 78 of rectangular cross-section is formed.

The first arm of the T-shaped channel 78 is arranged to receive the end of an input single mode optical fibre 80 that carries a signal beam. The second arm of the T-shaped channel 78 receives a single mode optical fibre 82 carrying a pump beam, whilst the third arm is arranged to receive a multi-mode erbium doped optical fibre 84. The end of each optical fibre carries an anti-reflection coating. Furthermore, the end of each optical fibre is cleaned such that the optical fibre face is angled a few degrees away from the normal to the optical axis. The angled face helps suppress any unwanted parasitic oscillations.

A wavelength selective reflective element 86 is located within an alignment slot at the intersection of the arms of the T-shaped channel. The reflective element 86 is reflective at the signal beam wavelength (typically 1.5 μm) and transmissive at the pump beam wavelength (980 nm). In use, the signal beam is reflected from the reflective element 86 to the multi-mode erbium doped optical fibre 84, whilst the pump beam passes through the selective reflective element 86 and is directed to the erbium doped multi-mode optical fibre 84.

A first set of lenses 88 are provided to shape the signal beam exiting the input single mode optical fibre 80, and a second set of lenses 90 are provided to shape the pump beam after it exits the single mode optical fibre 82. The lenses of the first and second set are held in alignment slots (not shown) formed in the silicon substrate 76 and provide beam expansion or compression as necessary.

Although FIG. 7 shows the various arms of the T-shaped channel to be the same width, the channels forming the various arms may have different cross-sectional dimensions. For example, the multi-mode erbium doped optical fibre 84 may be held in a channel having a width of around 1 mm; this width provides a good fit for the external diameter of the erbium doped multi-mode optical fibre. The single mode input and pump fibres may be located in smaller channels appropriate to their external dimensions. The various channel portions interconnecting the fibre ends may also be arranged to act as hollow core optical waveguides thereby guiding radiation between the optical fibres. The use of such hollow core optical waveguides minimises the dispersion effects that would be present with free space propagation.

To maximise optical coupling efficiency between the fibres and the hollow core optical waveguides, the hollow core optical waveguides formed in the substrate should be arranged to support a fundamental mode of equivalent form to that of the optical fibres. In other words, the effective beam diameter of light propagating through the hollow core waveguide should be matched to the effective beam diameter of light propagating through the optical fibre.

Figure 8:
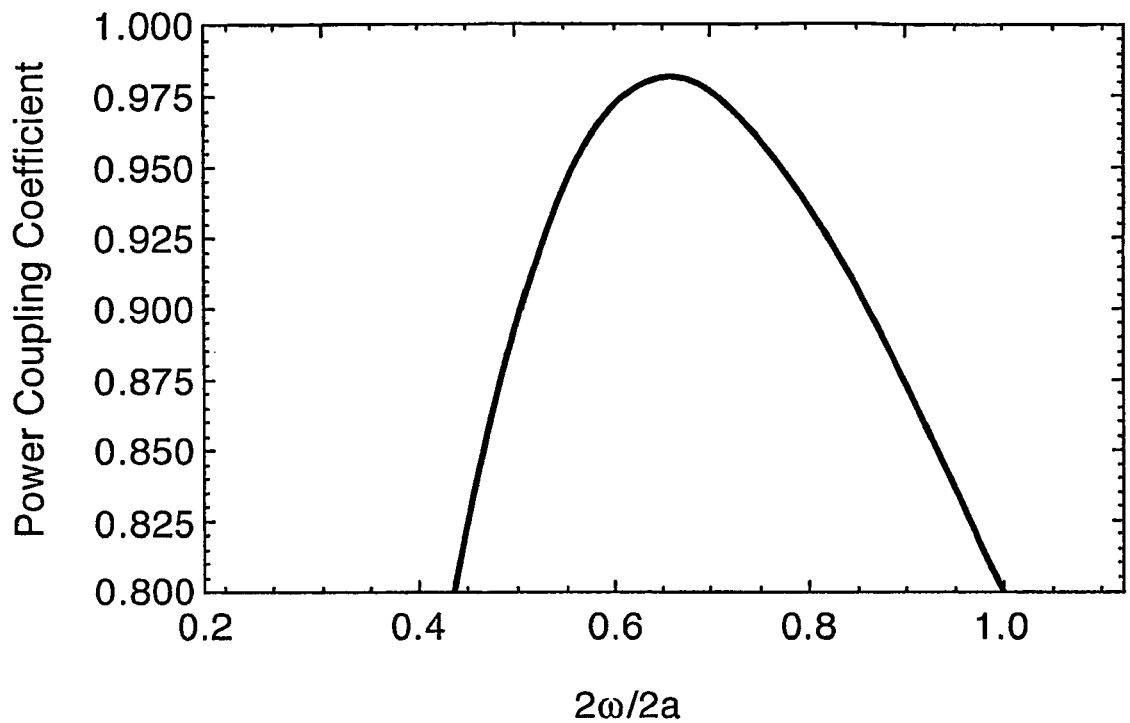
FIG. 8 shows the power coupling efficiency into the fundamental mode of a multi-mode waveguide as a function of the ratio of beam waist to waveguide core width.

Referring to FIG. 8, the power coupling efficiency of a Guassian beam into the circular cross-section core of an optical fibre is shown as a function of the ratio of the effective $TEM_{00}$ beam waist radius (W) to the radius of the optical fibre core (A). Hence, for an optical fibre having a core of width 2A, the effective $TEM_{00}$ beam waist of the input beam should be chosen such that W/A is around 0.64. In the case of an optical waveguide having a square cross-section, W/A should be selected to be around 0.703 to maximise coupling efficiency.

It has also been found that if light is incident on the core of the multi-mode optical fibre from a direction coincident with the optical axis of the fibre core, only the fundamental mode of the multi-mode optical fibre will be excited. However, higher order mode excitation will occur if the lateral and/or angular misalignment of light with respect to the optical axis of the fibre core is too large. In a practical device, the alignment accuracy of the various optical components will determine the angular and/or lateral alignment accuracy and will thus dictate the amount of power coupled into higher order optical modes.

For a given component alignment accuracy, it is thus possible to provide an optical fibre having a core diameter sufficiently small to ensure only fundamental mode excitation occurs. On this basis, the required angular alignment tolerance (θ) can be given by:

$$\theta \leq \lambda/10 \, w \qquad (2)$$

where θ is the propagating wavelength and w is the width of the multi-mode waveguide. In hollow waveguide core waveguide apparatus of the type described above, angular alignment tolerances of the order of 0.5 milliradians are achievable. Therefore, from equation (2), this angular alignment tolerance in conjunction with 1.5 μm radiation gives a maximum fibre core width of around 300 μm.

A similar analysis can be used to determine how straight an optical fibre needs to be held. A fibre bent to a given radius of curvature can be considered as a set of linear segments with small tilts between them. Considering two linear elements tilted with respect to one another, the effect of a tilt between them is to impose a. radial dependent phase error across the fibre diameter. This phase error spoils the coupling to the fundamental mode of the next linear segment of fibre; this is because the fundamental mode of the next segment has a plane phase front. The magnitude of the phase error scales as w.θ/λ. In turn, θ∝1/R where R, is the radius of curvature. As a consequence the magnitude of the phase error between two linear segments of a curved fibre is proportional to w/Rλ. On this basis predictions can be made of the fundamental mode fidelity at the exit of curved multimode fibres as a function of the three variables; i.e. w, the core diameter, R, the radius of curvature of the fibre, and, λ, the wavelength of the radiation in the core.

In comparison with a conventional single mode erbium doped fibre with a core diameter of 10 µm, a 300 µm core diameter would give a gain volume (and hence power) scaling of around one thousand. Therefore, a one meter length of 300 µm core diameter multi-mode erbium doped fibre would provide one hundred times more optical gain than a ten meter length of 10 µm core diameter single mode optical fibre. Furthermore, it can be seen that even a 10 cm length of multi-mode erbium doped fibre would provide ten times more optical gain than a ten meter length of single mode optical fibre. The present invention thus allows erbium doped amplifiers to be significantly reduced in size and/or provide more optical gain for a given length of doped fibre.

Figure 9:
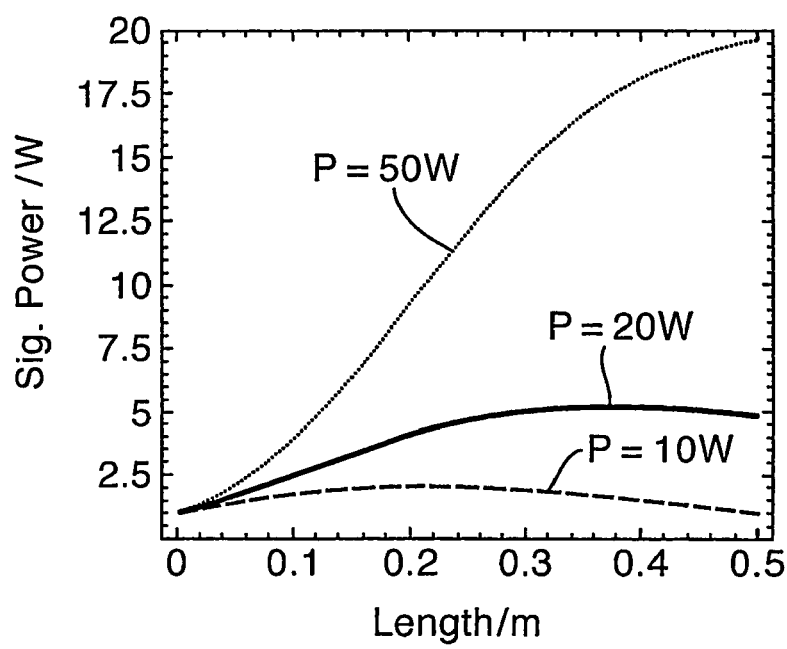
FIG. 9 shows signal power as a function of fibre length at three pump powers.

Referring to FIG. 9, the predicted output signal power produced by an EDFA of the present invention is shown as a function of Erbium doped fibre length for three pump powers (10 W, 20 W and 50 W). An input beam of 1 W was used. It can thus be seen that the benefits of increased pumping power are clear and that there is an optimum pump power for a given fibre length.

As described above, the beam to be amplified must propagate through the multi-mode fibre in mainly the fundamental mode to ensure modal dispersion effects do not reduce the bandwidth of the apparatus. It is also preferred, but by no means essential, for the pump beam to propagate through the erbium doped optical fibre in only the fundamental mode. Coupling the pump beam into only the fundamental mode of the multi-mode waveguide ensures good overlap with multimode fibre gain volume thereby increasing amplification efficiency.

The optical coupling arrangement shown in FIG. 7 may be used in the EDFAs described with reference to FIGS. 5 and 6 above. Furthermore, it would be appreciated how such an arrangement could be operated in reverse with a combined signal/pump beam being separated to provide an output signal beam that is injected into a single mode output optical fibre.

Figure 10:
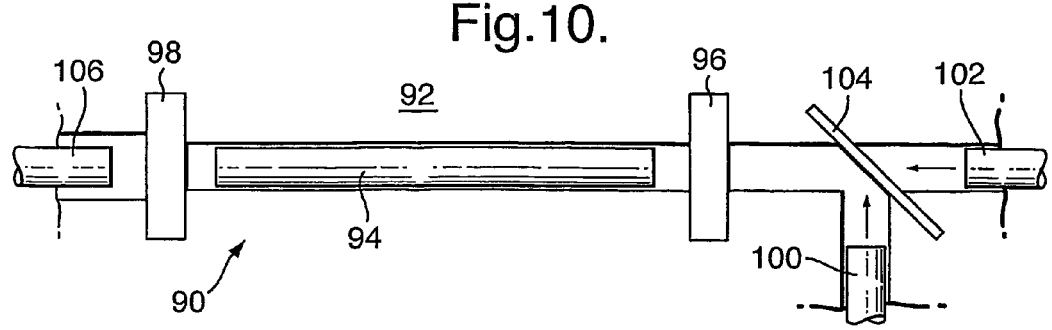
FIG. 10 shows a resonant optical amplifier.

Referring to FIG. 10, it is shown how the amplifier described above may form the basis of an optical fibre resonator 90. The resonator 90 is formed from a silicon substrate 92 and comprises a section of erbium doped multi-mode waveguide 94 held substantially straight in a channel formed in the substrate 92. The erbium doped multi-mode waveguide 94 is located between a first reflector 96 and a second reflector 98 that are held in alignment slots formed in the substrate 92. Although not shown, the first and second reflectors may be curved to provide high order mode suppression.

A beam to be amplified and a pump beam are provided by a single mode input fibre 100 and a single mode pump fibre 102. The beam to be amplified and the pump beam are combined by transmission/reflection from a wavelength selective reflector component 104, passed through the first reflector 96 and coupled into the fundamental mode of the erbium doped optical fibre 94 where amplification occurs.

After exiting the erbium doped optical fibre 94, the pump and amplified beams are guided to the second reflector 98. A proportion (e.g. a few percent) of the amplified beam passes through the second reflector 98 and is coupled into an output optical fibre 106. The remaining portion of the amplified beam and any remaining pump radiation is reflected by the second reflector 98 and coupled back into the erbium doped optical fibre 94. The first reflector 96 is arranged to be fully reflective to pump and amplified radiation incident on it from the erbium doped optical fibre 94. In this manner, a resonant cavity is formed by the first and second reflectors.

It should be noted that although a single length of erbium doped optical fibre is shown in FIG. 10, multiple lengths of optical fibre could be provided. For example, a folded arrangement of the type described with reference to FIG. 5 could be used.

In addition to high optical gain, the resonator described with reference to FIG. 10 has various additional advantages. For example, the substrate is in thermal contact with the optical fibre along its length and may thus be used to remove excess heat from the optical fibre. Such cooling may be achieved by passing a fluid (e.g. a gas or liquid) through the channel(s) supporting the optical fibre and/or separate cooling channels may be provided in the substrate.

Figure 11:
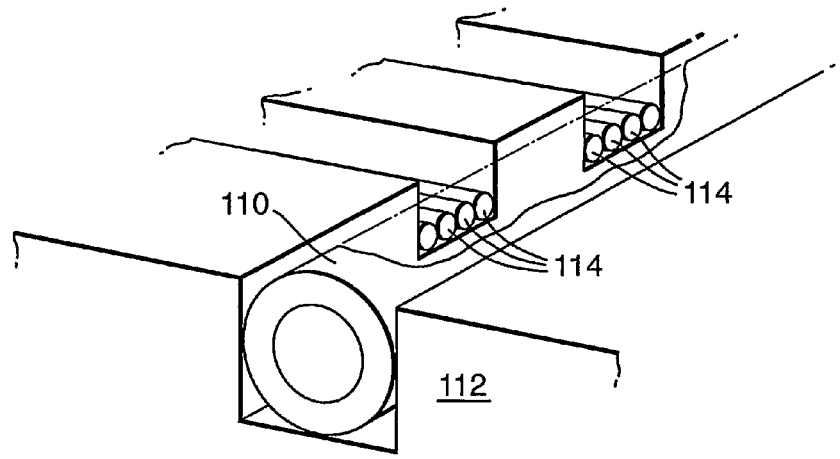
FIG. 11 shows an fibre amplifier comprising a side pump diode array.

The embodiments described above rely on the pump radiation being coupled into, and propagating along, the erbium doped optical fibre. Referring to FIG. 11, it is shown how a side pump arrangement may be alternatively, or additionally, employed.

FIG. 11 illustrates a section of erbium doped multi-mode optical fibre 110 that is held substantially straight in a channel formed in a silicon substrate 112. A signal beam is coupled into the multi-mode optical fibre 110 and predominately excites the fundamental mode therein. A plurality of pump laser diodes 114 are arranged to illuminate the side of the multi-mode optical fibre 110 through the fibre cladding. In this manner, the core of the multi-mode optical fibre 110 receives pump radiation and amplifies the signal beam propagating therein.

FIG. 11 shows laser diodes 114 that are orientated perpendicularly to the multi-mode optical fibre 110. However, it should be appreciated that the pump radiation may be directed to the optical fibre at any angle. The side pump arrangement may also be used to implement a cladding pumped arrangement of the type described above.

Figure 12:
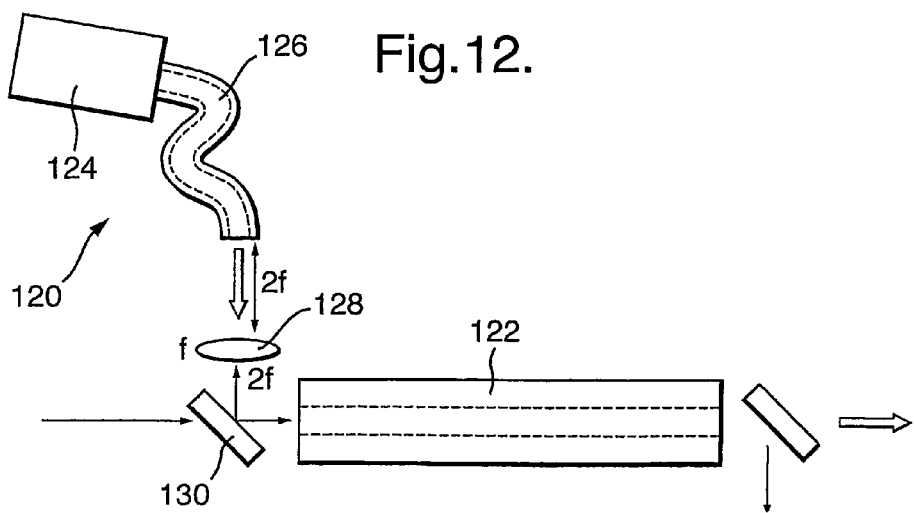
FIG. 12 illustrates a multi-mode waveguide laser source coupled to a section of amplifying optical fibre.

Referring to FIG. 12, a technique for coupling light between a multimode fibre pump source 120 and an erbium doped optical fibre 122 is illustrated. The multimode fibre pump source 120 comprises a pump diode array 124 coupled to a multimode pump fibre 126. The light output by the pump fibre 126 is directed via a lens 128 of focal length f and mirror 130 to the end of the erbium doped optical fibre 122.

If the pump fibre beam diameter is $d_p$ and the pump fibre numerical aperture (NA) is $NA_p$ then, for an erbium doped multimode fibre of core diameter $d_e$, the NA of the erbium doped fibre ($NA_e$) should be:

$$NA_e \geq NA_p \cdot \frac{d_p}{d_e} \quad (3)$$

In such a case, the magnification (m) imparted by the lens 128 is:

$$m = \frac{d_p}{d_e} \quad (4)$$

The NA of the erbium doped multimode fibre core that is required to provide efficient coupling from the multimode pump fibre (or pump beam) can thus be readily calculated. It should be appreciated that with identical core diameters for the multimode pump fibre and the multimode erbium doped fibre, the NA of the erbium doped core should be identical or greater than that of the multimode pump fibre.

Typically, multimode pump fibre NAs lie in the range 0.2-0.4. In conjunction with the NA design criteria outlined above, the provision of the single lens 128 for providing a magnifying/de-magnifying configuration can produce efficient geometric mode matching.

Ebium doped optical fibres are described above because they can be used to amplify radiation in the wavelength range of 1525 nm to 1610 nm which is advantageous for telecommunication applications. However, the invention is equally applicable to alternative amplifying optical fibres, for example any other rare-earth-doped silica fibres. More information about suitable amplifying fibres can be found on page 479 of Saleh and Teich, Fundamentals of Photonics, John Wiley and Sons, 1991, ISBN 047183965-5.

The skilled person would immediately recognise numerous applications in which an optical amplifier of the present invention could be used. For example, the amplifier could be used to provide high power optical beams for use in LIDAR systems and the like. The high levels of optical power could also be used to drive an optical parametric oscillator (OPO); previously the high optical losses associated with OPOs, coupled with the power limitations of prior art EDFAs, had severely constrained the output power of the optical beams that can be produced.

The invention claimed is:

1. An optical amplifier comprising at least two sections of amplifying optical fibre, pumping means for optically pumping the at least two sections of amplifying optical fibre and an optical fibre support means for holding the at least two sections of amplifying optical fibre substantially straight during use, wherein the optical fibre support means additionally comprises means to couple light between the at least two sections of amplifying optical fibre.

2. An optical amplifier according to claim 1 wherein the optical fibre support means comprises a substrate comprising at least two channels, each of the at least two sections of amplifying optical fibre being located in a channel of the substrate.

3. An optical amplifier according to claim 2 wherein the at least two channels are formed adjacent and substantially parallel to one another thereby forming a folded arrangement.

4. An optical amplifier according to claim 2 wherein the channels formed in the substrate have a substantially rectangular cross section.

5. An optical amplifier according to claim 2 wherein the means to couple light between the at least two sections of amplifying optical fibre comprises one or more hollow core optical waveguides formed in said substrate.

6. An optical amplifier according to claim 5 wherein a reflective coating is provided on the internal surface of the one or more hollow core optical waveguides.

7. An optical amplifier according to claim 2 wherein the substrate further comprises at least one alignment slot, the at least one alignment slot being arranged to receive an optical component.

8. A optical amplifier according to claim 7 wherein a lens is retained in the at least one alignment slot.

9. An optical amplifier according to claim 2 wherein the substrate further comprises at least one optical fibre end attachment means.

10. An optical amplifier according to claim 2 wherein the substrate comprises semiconductor material.

11. An optical amplifier according to claim 2 wherein the channels are formed in the substrate using a deep reactive ion etching (DRIE).

12. An optical amplifier according to claim 1 wherein the pumping means provides a pump beam that is routed through each section of amplifying optical fibre in series.

13. An optical amplifier according to claim 1 wherein the pumping means provides a plurality of pump beams that are separately routed to each section of amplifying optical fibre.

14. An optical amplifier according to claim 1 wherein the core diameter of at least one section of amplifying optical fibre is greater than 50 µm.

15. An optical amplifier according to claim 1 wherein at least one section of amplifying optical fibre is a multi-mode optical fibre.

16. An optical amplifier according to claim 1 wherein at least one section of amplifying optical fibre is a single mode optical fibre.

17. An optical amplifier according to claim 1 wherein the core of at least one section of the amplifying optical fibre comprises a rare earth metal dopant.

18. An optical amplifier according to claim 1 wherein beam input means are provided for coupling an input beam into a section of amplifying optical fibre.

19. An optical amplifier according to claim 18 wherein the beam input means comprises at least one lens.

20. An optical amplifier according to claim 18 wherein the beam input means is arranged such that the input beam predominantly excites the fundamental mode of propagation in said section of amplifying optical fibre.

21. An optical amplifier according to claim 18 wherein the beam input means is arranged to receive the input beam from a single mode optical fibre.

22. An optical amplifier according to claim 1 wherein beam output means are provided to couple an amplified beam from a section of amplifying optical fibre into an output single mode optical fibre.

23. An optical amplifier according to claim 1 wherein the pumping means comprises at least one laser.

24. An optical amplifier according to claim 23 wherein the pumping means comprise at least one multimode optical fibre optically coupled to the output of the at least one laser, said multimode optical fibre also being optical coupled to a section of amplifying optical fibre.

25. An optical amplifier according to claim 24 wherein the numerical aperture of the amplifying optical fibre is greater than the numerical aperture of the multimode optical fibre.

26. An optical amplifier according to claim 24 wherein the multimode optical fibre is coupled to a section of amplifying optical fibre via a lens system having a magnification (m), wherein the numerical aperture of the amplifying optical fibre is greater than the product of the numerical aperture of the multimode optical fibre and the magnification (m).

27. An optical amplifier according to claim 1 wherein the pumping means comprises an array of laser diodes, said array of laser diodes being arranged to apply a pump beam to the side of each section of amplifying optical fibre.

28. A laser device comprising an optical amplifier according to claim 1 and two selectively reflective elements, wherein the optical amplifier is arranged with respect to the selectively reflective elements to form a resonant laser cavity.

* * * * *